US009748569B2

(12) United States Patent
Li et al.

(10) Patent No.: US 9,748,569 B2
(45) Date of Patent: Aug. 29, 2017

(54) POROUS, THIN FILM ELECTRODES FOR LITHIUM-ION BATTERIES

(71) Applicant: APPLEJACK 199 L.P., San Jose, CA (US)

(72) Inventors: Wenming Li, San Jose, CA (US); Byunghoon Yoon, San Jose, CA (US); Ann Koo, San Jose, CA (US)

(73) Assignee: APPLEJACK 199 L.P., San Jose, CA (US)

( * ) Notice: Subject to any disclaimer, the term of this patent is extended or adjusted under 35 U.S.C. 154(b) by 9 days.

(21) Appl. No.: 14/018,213

(22) Filed: Sep. 4, 2013

(65) Prior Publication Data

US 2016/0104888 A1    Apr. 14, 2016

(51) Int. Cl.
| | | |
|---|---|---|
| *H01M 4/525* | (2010.01) | |
| *H01M 4/04* | (2006.01) | |
| *H01M 10/04* | (2006.01) | |
| *H01M 10/058* | (2010.01) | |
| *H01M 10/0525* | (2010.01) | |
| *H01M 10/056* | (2010.01) | |
| *H01M 10/052* | (2010.01) | |
| *H01M 4/02* | (2006.01) | |

(52) U.S. Cl.
CPC ......... *H01M 4/525* (2013.01); *H01M 4/0426* (2013.01); *H01M 10/0436* (2013.01); *H01M 10/052* (2013.01); *H01M 10/056* (2013.01); *H01M 10/058* (2013.01); *H01M 2004/021* (2013.01); *H01M 2220/30* (2013.01)

(58) Field of Classification Search
CPC ............... H01M 4/525; H01M 4/0426; H01M 10/0436; H01M 10/0525; H01M 10/056; H01M 10/058; H01M 2220/30; H01M 10/052; H01M 2004/021; C04B 35/64
See application file for complete search history.

(56) References Cited

U.S. PATENT DOCUMENTS

| | | | | |
|---|---|---|---|---|
| 6,982,132 B1 * | 1/2006 | Goldner | ............... | E06B 9/24 204/192.11 |
| 2003/0157248 A1 * | 8/2003 | Watkins | ............... | B01D 67/003 427/256 |
| 2009/0035664 A1 * | 2/2009 | Chiang | ............... | H01M 4/0426 429/317 |
| 2010/0035152 A1 * | 2/2010 | Sastry | ............... | B82Y 30/00 429/218.1 |
| 2013/0102805 A1 * | 4/2013 | Hong | ............... | C04B 35/01 556/28 |

* cited by examiner

*Primary Examiner* — Milton I Cano
*Assistant Examiner* — Michael Dignan
(74) *Attorney, Agent, or Firm* — Maschoff Brennan

(57) ABSTRACT

A porous thin film battery is described herein. The battery includes a substrate, a porous thin film cathode formed on the substrate, an electrolyte layer formed on the porous thin film cathode and a porous thin film anode formed on the electrolyte layer. The porous thin film cathode includes a first set of pores initially filled with a quantity of a first polymer material and then the first polymer material is removed to form the first set of pores. The porous thin film anode includes a second set of pores initially filled with a third polymer material and then the third polymer material is removed to form the second set of pores. A method of forming the porous thin film battery is also described. A system for forming the porous thin film battery is also described.

11 Claims, 10 Drawing Sheets

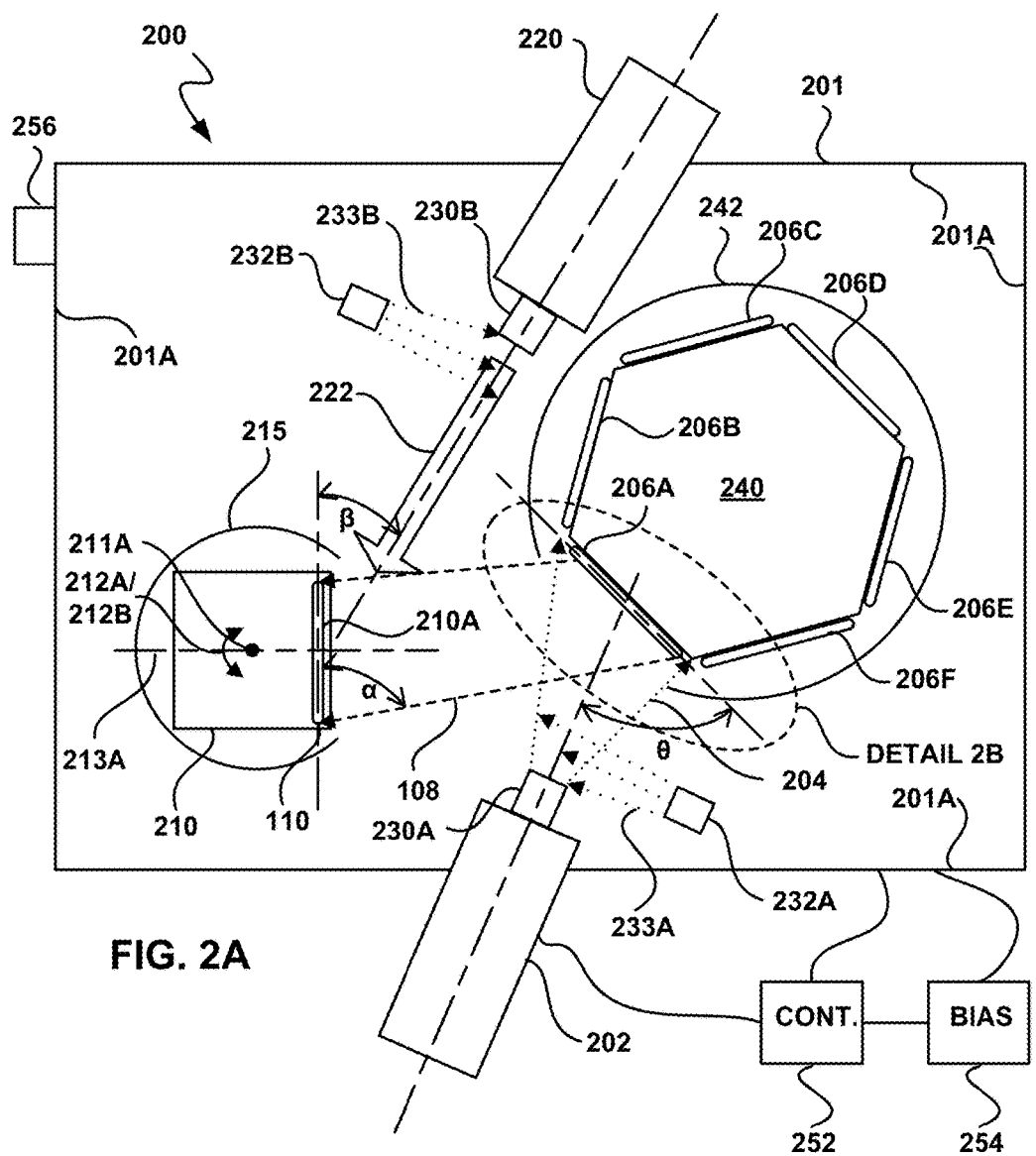
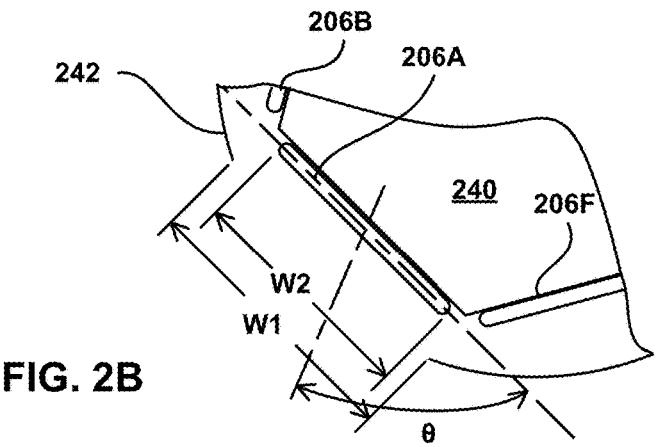
FIG. 2A
FIG. 2B

POROUS, THIN FILM ELECTRODES FOR LITHIUM-ION BATTERIES

BACKGROUND

The present invention relates generally to electrical power storage systems, and more particularly, to methods and systems for making lithium-ion batteries.

Traditional lithium ion batteries lack sufficient energy density (Watt-hours/kilogram) for many electrical systems. By way of example, the insufficient energy density of traditional lithium-ion batteries limits the electric vehicle driving range between recharges. Electric vehicles are a major step in moving transportation systems of a modem, energy based economy away from greenhouse gas emitting fossil fuel engines.

In view of the foregoing, there is a need for an electrical energy storage solution with a greater energy density than traditional lithium-ion batteries.

SUMMARY

Broadly speaking, the present invention fills these needs by providing a lithium-ion battery using porous, thin films as an electrical energy storage solution electrical power storage system. It should be appreciated that the present invention can be implemented in numerous ways, including as a process, an apparatus, a system, computer readable media, or a device. Several inventive embodiments of the present invention are described below.

One embodiment provides a porous thin film battery including a substrate, a porous thin film cathode formed on the substrate, an electrolyte layer formed on the porous thin film cathode and a porous thin film anode formed on the electrolyte layer.

The porous thin film cathode can include a first set of pores initially filled with a quantity of a first polymer material and then the first polymer material is removed to form the first set of pores. Alternatively, the porous thin film cathode can include a first set of pores initially filled with a quantity of a first monomer material and then the first monomer material can be converted to a second polymer material and the second polymer material can be removed to form the first set of pores. The porous thin film cathode can include a porous lithium, cobalt and oxygen layer. The porous thin film cathode can include a porous lithium, cobalt and oxygen layer also including a quantity of residual carbon remaining from the removal of the polymer.

The electrolyte layer can include a lithium ion containing material. The electrolyte layer can include at least one of a group consisting of a lithium, phosphorous, oxygen, nitrogen layer, a lithium aluminum oxide layer and/or a lithium sulfur complex layer.

The porous thin film anode can include a second set of pores initially filled with a third polymer material and then the third polymer material is removed to form the second set of pores. Alternatively, the porous thin film anode can include a second set of pores initially filled with a quantity of a second monomer material and then the second monomer material can be converted to a fourth polymer material and the fourth polymer material can be removed to form the second set of pores.

Another embodiment provides a porous thin film battery is described herein. The battery includes a substrate, a porous thin film cathode formed on the substrate, an electrolyte layer formed on the porous thin film cathode and a porous thin film anode formed on the electrolyte layer. The porous thin film cathode includes a first set of pores initially filled with a quantity of a first polymer material and then the first polymer material is removed to form the first set of pores. The porous thin film anode includes a second set of pores initially filled with a third polymer material and then the third polymer material is removed to form the second set of pores.

Yet another embodiment provides a method of forming a porous thin film battery. The method including forming a porous thin film cathode formed on a substrate, forming an electrolyte layer on the porous thin film cathode and forming a porous thin film anode on the electrolyte layer.

Forming the porous thin film cathode can include forming a first set of layers of a cathode material on the substrate, forming a second set of layers of a polymer material, wherein the second set of polymer material layers are disposed between at least a portion of the first set of cathode material layers. Annealing the first set of cathode material layers and the second set of polymer material layers to form a cathode combination layer and removing the polymer material to form a first set of pores in the cathode combination layer.

Removing the polymer material can include evaporating the polymer materials. Each one of the first set of cathode material layers can have a thickness of between about 1 micrometer and about 50 micrometers. Each one of the second set of layers of the polymer material can have a thickness of between about 1 micrometer and about 50 micrometers. The cathode combination layer can have a thickness of between about 1 micrometer and about 50 micrometers.

Forming the porous thin film cathode can include forming a first set of layers of a cathode material on the substrate, forming a third set of layers of a monomer material, wherein the third set of monomer material layers are disposed between at least a portion of the first set of cathode material layers. The third set of monomer material layers is converted to a second set of polymer material layers. The first set of cathode material layers and the second set of polymer material layers are annealed to form a cathode combination layer and the polymer material is removed to form a first set of pores in the cathode combination layer. The cathode combination layer can have a thickness of between about 1 micrometer and about 50 micrometers.

Forming the porous thin film anode can include forming a fourth set of layers of an anode material on the electrolyte layer, forming a fifth set of layers of a polymer material, wherein the fifth set of polymer material layers are disposed between at least a portion of the fourth set of anode material layers. The fourth set of anode material layers and the fifth set of polymer material layers are annealed to form an anode combination layer and the polymer material is removed to form a second set of pores in the anode combination layer.

Forming the porous thin film anode can include forming a fourth set of layers of an anode material on the electrolyte layer, forming a sixth set of layers of a monomer material, wherein the sixth set of monomer material layers are disposed between at least a portion of the fourth set of anode material layers. The sixth set of monomer material layers is converted to a fifth set of polymer material layers and the fourth set of anode material layers and the fifth set of polymer material layers are annealed to form an anode combination layer. The polymer material is removed to form a second set of pores in the anode combination layer.

Another embodiment provides a system for forming a porous thin film battery.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIGS. 2A, 2B and 2C show various views of a biased ion beam sputtering (BIBS) system, in accordance with embodiments of the present invention.

DETAILED DESCRIPTION

Several exemplary embodiments for porous, thin film electrodes for a lithium-ion battery systems and methods will now be described. It will be apparent to those skilled in the art that the present invention may be practiced without some or all of the specific details set forth herein.

Typically available lithium-ion battery packs, such as may be used in an electric vehicle (EV) and other large power consumption and high power density demands are prohibitively expensive for powering a mass transportation system.

Conventional lithium-ion batteries use carbon-based graphite anodes. Silicon (Si) is a promising anode materials in solid state lithium-ion battery applications due to the high charge density and low operation voltage with maximum lithium uptake of Li/Si=4.4/1.0, Li22Si5. By way of example, a higher charge density for silicon is 3,579 milli-amp-hours per gram (mAh $g^{-1}$) at ambient temperature as compared to the maximum theoretical charge density of 372 mAh g-1 for a conventional graphite anode system.

Unfortunately the volume of a bulk silicon anode drastically expands during the lithium-ion intercalation (i.e., lithiation). At the reduced volume of materials, surface-to-volume ratio increased and "bulk properties" of the materials can be affected substantially.

Sputter deposition is a physical vapor deposition (PVD) process typically referred to as sputtering. There are several types of sputtering systems including ion beam sputtering (IBS) system. A sputtering process includes directing high energy gas ions such as $Ar^+$, $Kr^+$ or $Xe^+$ toward a target. A portion of the high energy gas ions are reflected off of the target as neutral specie. The typical PVD process produces significant non-uniformities in the form of interlayer mixing in a thickness of nano-meter (1.0 nm=1.0$^{-9}$ m) level, excess surface roughness and excess contamination during the fabrication of multilayers of nickel. Higher energies of these neutrals, in excess of 50 eV (1.0 eV=1.60×10$^{-19}$ J lkg·m$^2$/s$^2$l) which are able to reach the growth surface are one cause of the interlayer mixing. A tradeoff between interfacial roughness and interlayer mixing are experimentally observed at the giant magnetoresistive (GMR) multilayers when the GMR layers are deposited using an intermediate energy in RF diode and magnetron sputtering.

Figure 1:
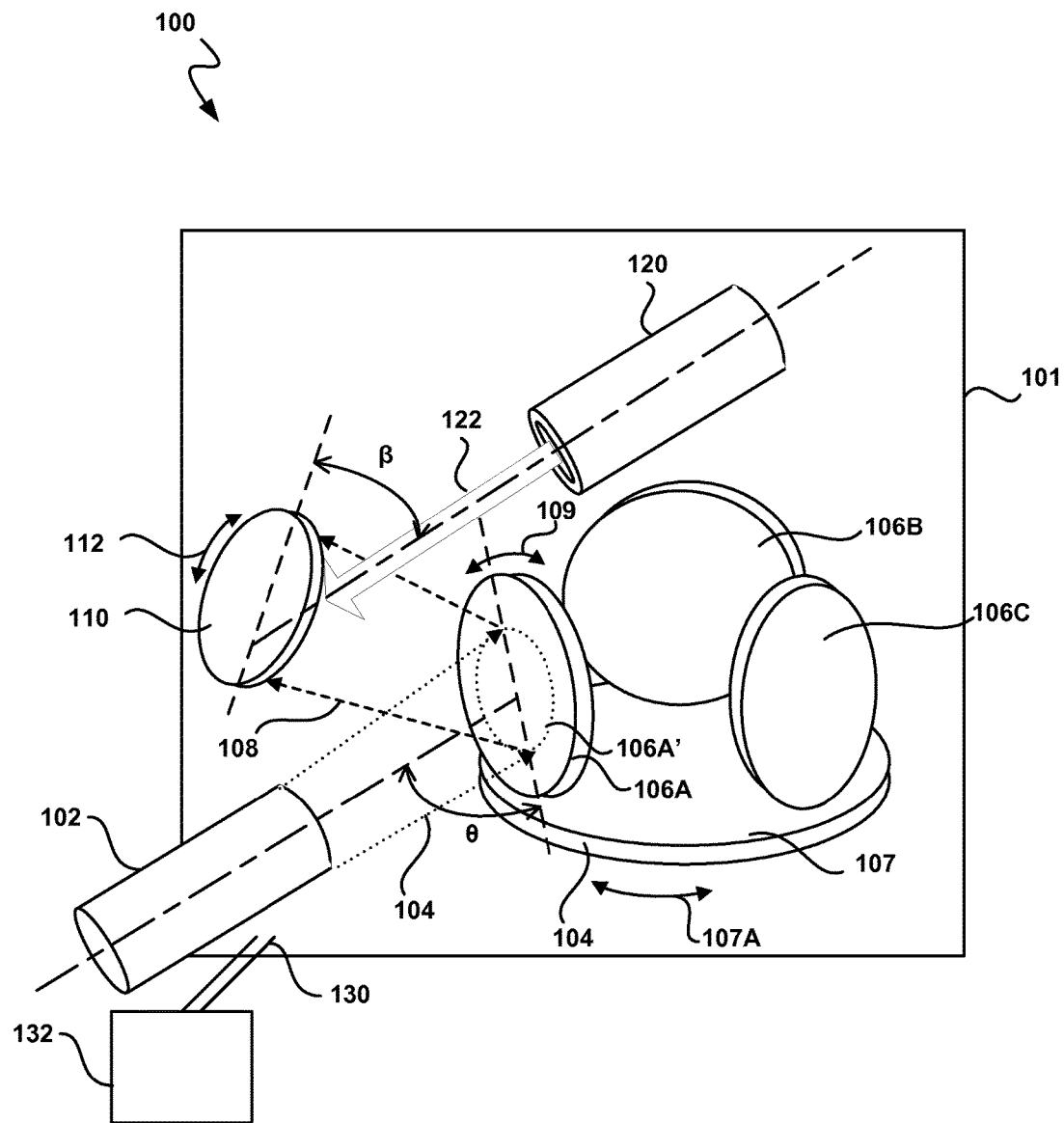
FIG. 1 is a pictorial diagram of a typical ion beam sputtering (IBS).

FIG. 1 is a pictorial diagram of a typical ion beam sputtering (IBS) 100. The typical IBS system 100 includes a primary grid ion beam gun 102 that is used to generate the high-energy ions ($Ar^t$, $Kr^+$ and $Xe^+$) 104. The high energy ions 104 have an energy level of between about 500 and about 2000 eV. The high energy ions 104 are generated by collisions with electrons that are confined by a magnetic field, such as in a magnetron. The high energy ions 104 are then accelerated by the electric field emanating from a grid (not shown) in the primary grid ion beam gun 102 and directed toward the target 106A. The system 100 can include multiple targets 106A-C supported on a target support 107. The target support 107 can rotate in directions 107A to select one of the targets 106A-C.

The high energy ions 104 sputter i.e., remove, atoms 108 from the target 106A. The atoms 108 sputtered from the surface of the target 106A are then deposited on the substrate 110 surface in multiple atomic or near atomic layers to form thicker layers of the target material on the substrate.

A second grid ion beam gun 120 can also be used to create lower energy inert gas ions 122 that are directed to the substrate 110 to assist layer growth. The lower energy inert gas ions 122 have an energy level of between about 50 and about 200 eV. The substrate 110 can also be rotated, such as in directions 112 during the deposition process.

The high energy ions 104 are neutralized by electrons emitted from the second grid ion beam gun 120 or other source. Typically, the energy of the high energy ions 104, the energy of assisting ions 122, the incident angle 0 of the high energy ions 104 at the target, and the incident angle 13 of assisting ions 122 at the substrate 110 can all be selected and controlled such as by rotating the target 106A in directions 109.

The IBS system has an advantage in that the energy and flux of high energy ions 104 and the assisting ions 122 can be controlled independently. Since the energy and flux of high energy ions 104 that strikes the target 106A is composed of neutral atoms, the target can be formed of either insulating or conducting materials. Due to the relative angle required to reflect the high energy ions 104 off of the target 106A and toward the substrate 110 means that the high energy ion incident angle 0 must be less than or greater than 90 degrees, but cannot be at 90 degrees.

The IBS system employs a pressure gradient between the primary grid ion beam source 102 and the chamber 101. The chamber is maintained at between about 10$^{-4}$ and 10$^{-5}$ Ton.

The pressure gradient is generated by placing the gas inlet 130, coupled to a gas source 132, near or within the primary grid ion beam source 102 and injecting the gas into the chamber 101. The IBS system processing yields excellent control and repeatability of film thickness and properties.

Process pressure in IBS system chamber 101 is between about $10^{-4}$ and about $10^{-5}$ Torr. The relatively low pressure reduces scattering of ions 104, 122 delivered by the respective ion sources 102, 120 or material 108 sputtered from the surface of the targets 106A-C. Compared to other sputtering systems such as using magnetron or diode, IBS systems are highly directional and more energetic. In combination with a substrate fixture that rotates and changes the assisting ions incident angle p, IBS systems can deliver a broad range of control over sidewall coatings, trench filling and liftoff profiles.

Figure 2C:
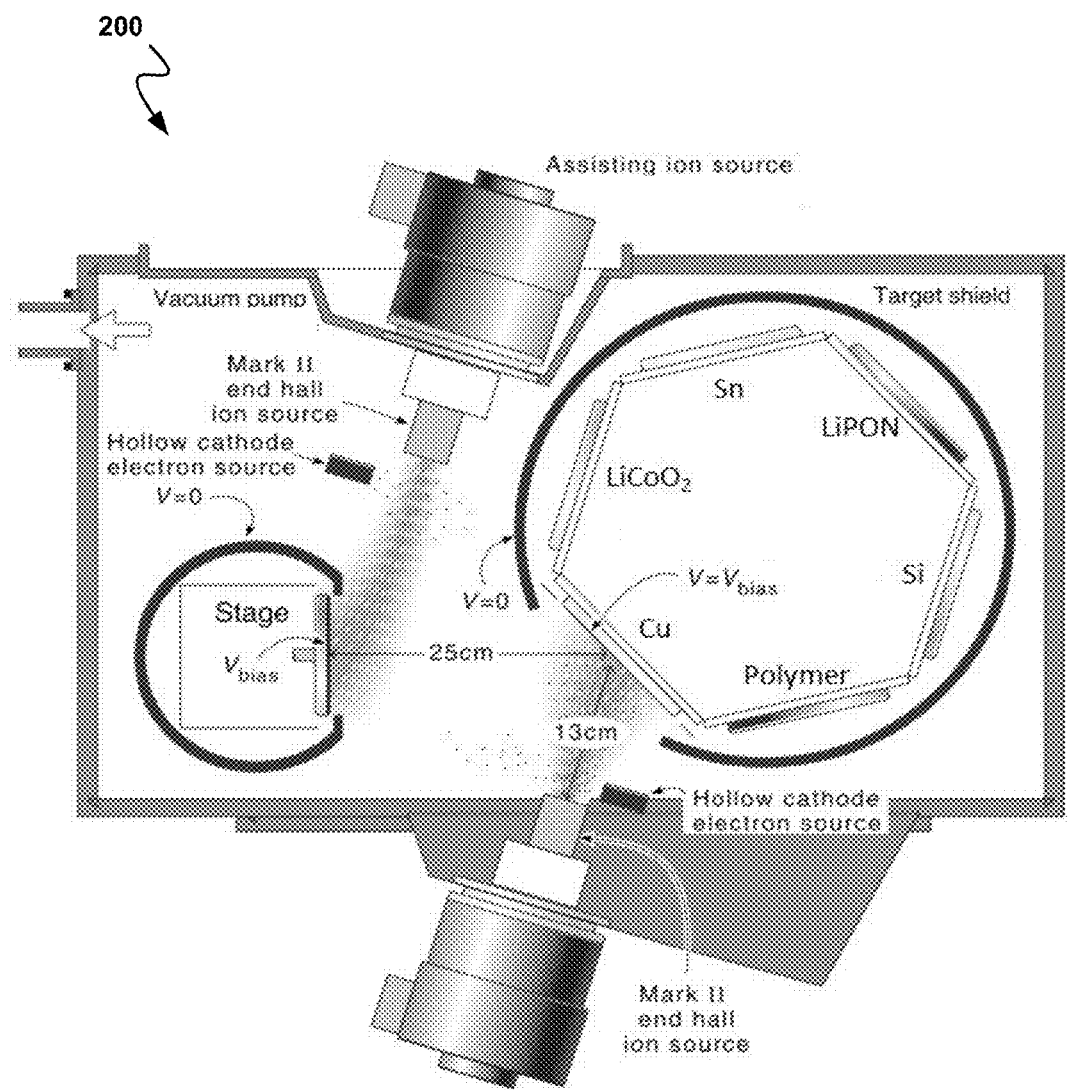

FIGS. 2A, 2B and 2C illustrate a biased ion beam sputtering (BIBS) system 200, in accordance with embodiments of the present invention. The BIBS system 200 includes a processing chamber 201, a rotating target subsystem 206, two low energy sources 202, 220 and a substrate stage 210. The rotating target subsystem 206 can include multiple different targets 206A-206F. The multiple different targets 206A-206F can be installed for multilayer deposition up to six different materials. It should be understood that additional targets or fewer targets could be included.

The substrate stage 210 includes a substrate supporting surface or plane 210A that supports the substrate 110. The substrate plane 210A can be rotated about its axes 211A, 211B in two dimensions and in directions 212A-212B and in directions 212C-212D, to select a desired atoms incident angle a and/or assisting ions incident angle 13 from between 0 degrees to about 90 degrees. The substrate plane 210A can be rotated about its axes 211A, 211B during the deposition process. A magnetic field 220 can be applied substantially parallel to the surface of the substrate 110A to aid in depositing layers of sputtered atoms 108.

The low energy ion sources 202, 220 work in combination with a combination of end-Hall ion sources 230A, 230B and hollow cathode electron sources 232A, 2232B, respectively. The hollow cathode electron sources 232A, 232B to eject electrons into the respective end-Hall ion source 230A, 230B. The end-Hall ion sources 230A, 230B can maintain a stable plasma.

In general, increasing the ion energy can increase the fabricated film density and reduce the growth surface roughness. However, increasing the ion energy can also cause an increase in interlayer mixing. Therefore, modulated energy and sequential ion assistance are used to delay the occurrence of the interlayer mixing to higher ion energy levels. As a result, higher ion energies produced from the above mentioned process can be contributed to improve film density and surface smoothness without causing significant interlayer mixing as a result. The low energy ion sources 202, 220 produce an output of between about 5 and about 50 eV. The low energy ion sources 202, 220 are included with hollow cathode electron source and end hall ion source reliably produce a very high density (e.g., at least about $1 \times 10^{12}$ ions/cm$^3$) of inert gas ions having a very low energy (e.g., between about 5 and about 50 eV). A negative bias voltage of between about −5 and about −2000 V is applied to the sputtering targets and the inert gas ions having a low ion energy are attracted and easily controlled to create a high dense of ions flux. The first ion source 202 outputs an ion flux 204 having a high density and having an energy level of between about 5 and about 50 eV and directs the low energy ions 204 toward the sputtering target 206A. The second ion source 220 outputs low energy assisting ion flux 222 having a high density and having an energy level of between about 5 and about 50 eV to assist in multi-layer deposition on the substrate surface 110A.

A bias signal 240 can be applied to the selected sputtering target 206A-F. The ion flux 204 can strike the target 206A at a near normal incident angle 0. The near normal incident angle 0 reduces both the energy and flux of reflected neutrals 208. Depending on the bias signal 240 voltage, the impact energy of the ion flux 204 on the target 206A can be easily controlled between 50 and 2000 eV.

Most of the ions in the ion flux 204 will strike the biased target 206A because a target shield 242 and a chamber wall 201A are grounded. While a portion 204A of the ions in the ion flux 204 may miss the selected target 206A, the portion 204A will have only the un-accelerated low energy that is below an energy level to cause sputtering (e.g., below a sputtering threshold energy). As a result, the portion 204A of the ions do not cause any overspill contamination. Limiting or substantially eliminating the overspill contamination eliminates the need to capture all of the ion flux 204 on the selected target 206A. Limiting or substantially eliminating the overspill contamination also allows the use of an ion beam that has a width W1 that is broader than the width W2 of the selected target. As a result, the entire surface 206A' of the selected target 206A can be more uniformly exposed to the ion flux 204. Both the target material utilization efficiency and deposition thickness uniformity are significantly improved.

As set forth above, overspill contamination is limited or substantially eliminated even when the ion flux 204 is not focused on a portion of the surface 206A' of the selected target 206A. Any loss of deposition rate due to low sputtering yield can be compensated for with an increased ion density. In addition, the BIBS system has potential to increase the deposition rate if the increased ion flux can over compensate for the reduced sputtering yield per ion.

Rapid Thermal Processing

Rapid thermal processing (RTP) refers to a semiconductor manufacturing process which heats substrates such as silicon wafers to high temperatures (e.g., up to about 1,200 degrees C. or greater) within a relatively short timescale of several seconds or less. Cooling the substrates requires temperatures be reduced slowly so the substrates are not damaged (e.g., thermal stress fractures) due to thermal shock. High intensity lamps or lasers are typically used in RTP to achieve the rapid heating rates. RTP is typically used for a wide variety of applications in semiconductor manufacturing including dopant activation, thermal oxidation, metal reflow, physical vapor deposition (PVD) and chemical vapor deposition (CVD). The RTP can be applied in a separate RTP chamber. The RTP chamber typically utilizes an about atmospheric pressure (e.g., between about 0.5-1.5 Toff) for processing cathodes. The RTP chamber typically utilizes a low vacuum (e.g., between about 10 and about 1000 mTorr) for processing anodes. The RTP chamber is typically purged with an inert gas (e.g., nitrogen, argon, etc.) during processing.

BIBS biased target deposition is a hybrid between IBS and conventional sputter deposition that combines the best of each technique. BIBS is uniquely suited to demanding applications requiring atomically engineered thin films and interfaces as BIBS offers a large range of process pressures and excellent uniformity and repeatability. High performance multilayer devices such as magnetoresistive multilayers, optical interference filters, and gate dielectric stacks are particularly well suited to BIBS.

Figure 3A:
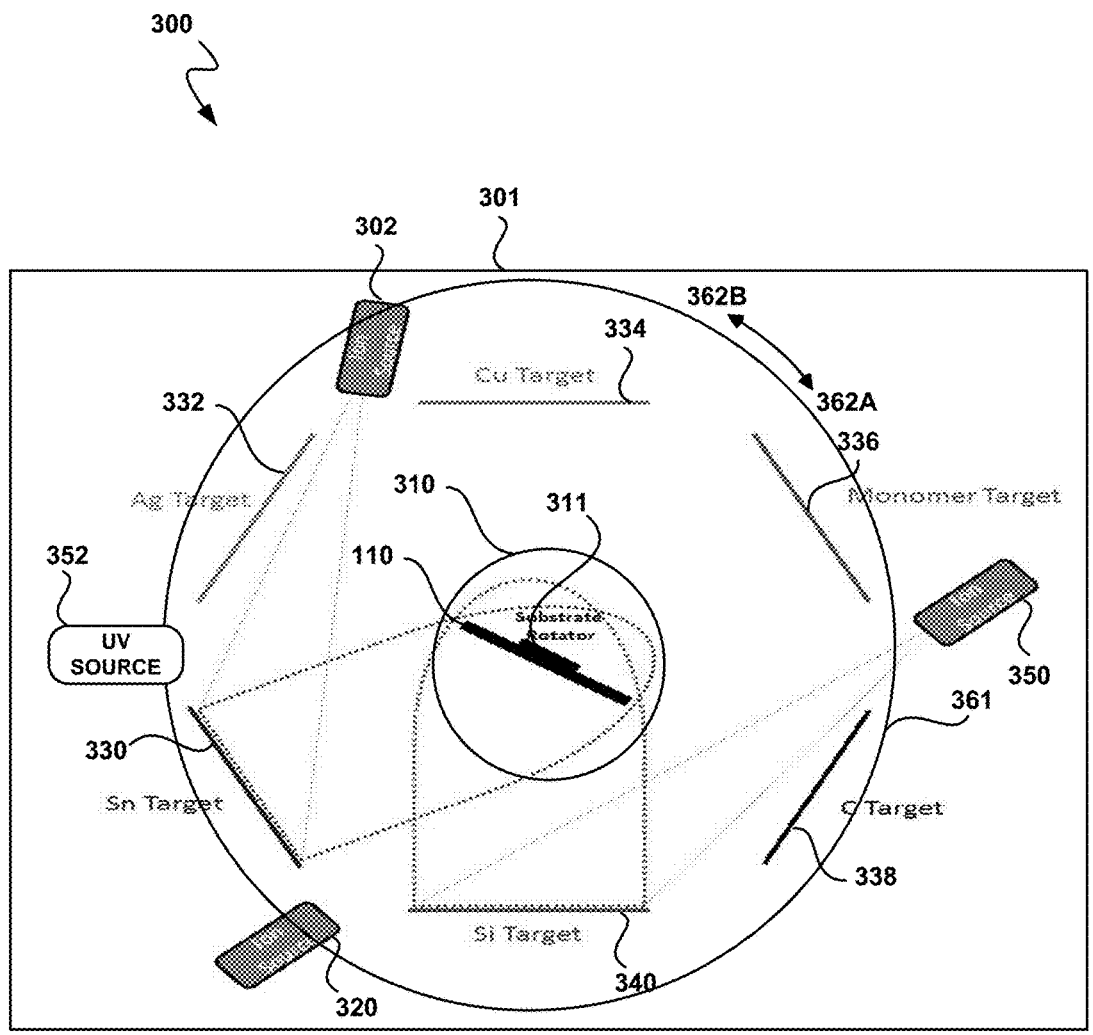
FIG. 3A is a simplified schematic diagram of a BIBS, in accordance with embodiments of the present invention.

FIG. 3A is a simplified schematic diagram of a BIBS 300, in accordance with embodiments of the present invention. The BIBS 300 can also be used to produce porous thin film anode materials. The BIBS 300 includes at least two ion sources such as sputtering ion source 302 and assisting ion source 320. The BIBS 300 also includes multiple targets 330-340. The substrate 110 is mounted on a substrate rotator 310 capable of rotating the substrate about a axis 311 perpendicular to the plane of the drawing.

The sputtering ion source 302 produces an ion current at the target 330-340 that is substantially independent of the target voltage. As a result, any ions that may miss the target 330-340 do not generate unwanted sputtering.

Figure 3B:
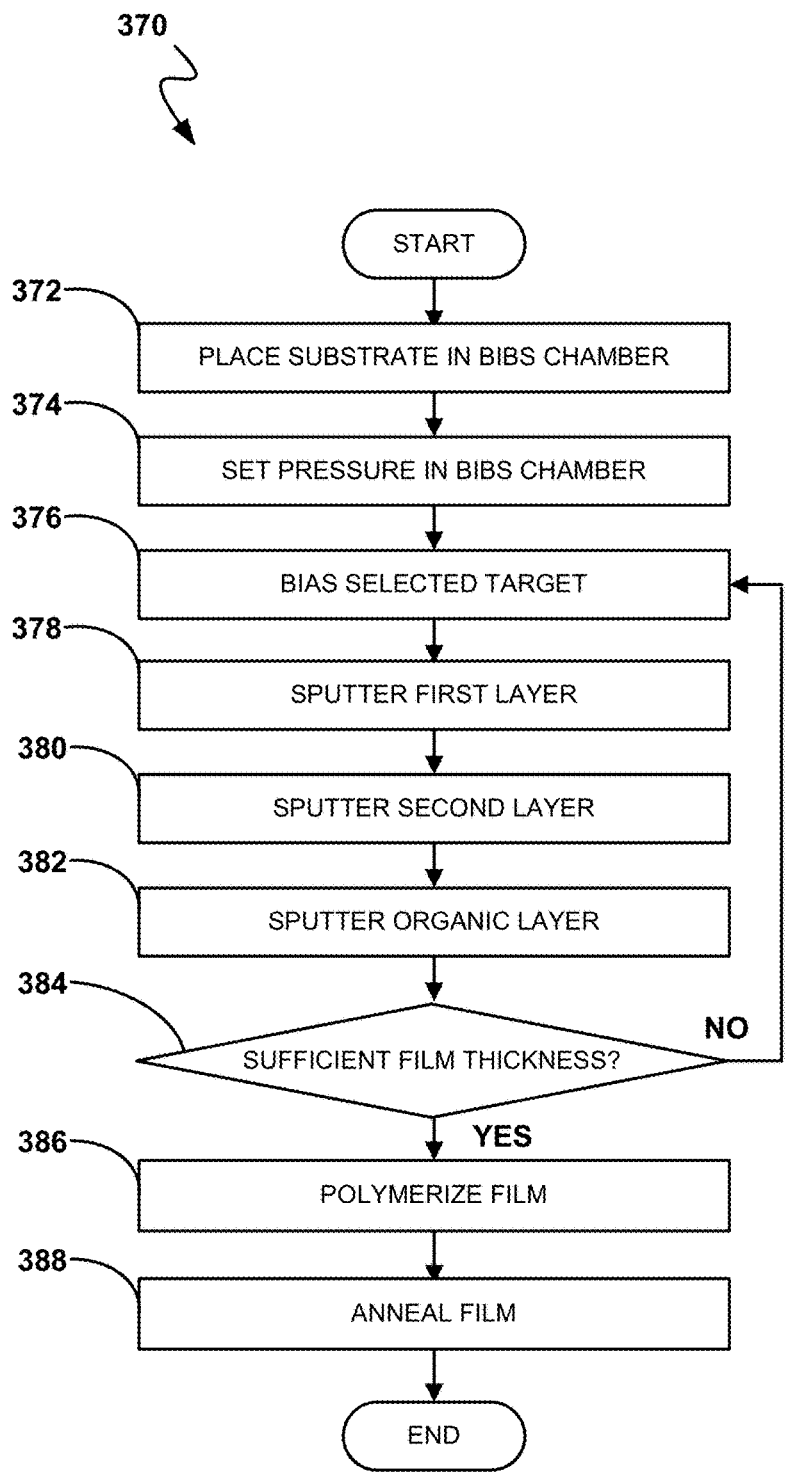
FIG. 3B is a flowchart diagram of the method operations for forming a porous film in the BIBS, in accordance with embodiments of the present invention.

FIG. 3B is a flowchart diagram of the method operations for forming a porous film in the BIBS 300, in accordance with embodiments of the present invention. In an operation 372, the substrate 110 is placed on the substrate support 310 in the BIBS chamber 301.

In an operation 374, the BIBS chamber 301 is placed at a desired operating pressure. The BIBS chamber 301 operating pressure can be between about $1 \times 10^{-4}$ to about $5 \times 10^{-3}$ TOIT.

In an operation 376, a bias voltage is applied to a first target 330. The target bias voltage can be in a range of between about −50 to about −2,000 V to produce reasonable deposition rates. A relatively high deposition rate is usually more than about 1.0 Angstroms per second. Reasonable deposition rates of between about 0.1 and 1.0 angstrom per second are acceptable. Expected typical deposition rate is about 0.5 Angstroms per second. Each deposited layer has a thickness of between less than about 100 nanometer to about 50 micrometers.

As an example process, for depositing a transition metal layer such as Co, Ni and Fe with thickness of 100 nm on solid substrate, the voltage on each of the targets can be varied from about −200 to about −400 and then to about −800V then the expected film growth rates of Co, Ni and Fe can be about 0.6, 0.8 and 1.0 Angstroms per second, respectively. Restated, a Co layer can be deposited at a selected rate corresponding to the voltage of −200V at a rate of 0.6 Angstroms per second. Similarly, an Ni layer can be deposited at a selected rate corresponding to the voltage of −400V at a rate of 0.8 and a Fe layer can be deposited at a selected rate corresponding to the voltage of −800V at a rate of 1.0 Angstroms per second.

Using the same target voltage for different materials can result in different deposition rates due to the resistivity of the different materials. The selected target voltage determines the atomic scale mixing at thin film interfaces and the overall roughness of the growing film.

In an operation 378, the assisting ion source 320 directs ions at the substrate 110 to modify the properties of the growing films. The relatively low energy ions emitted from the assisting ion source 320, e.g., between about 5 to about 15 volts, assist in smoothing the deposition of thin films on the substrate 110.

The BIBS can deposit multi-layers on the substrate 110 using multiple, rotating, biased, sputtering targets 330-340 in the system including low energy ion assist, high energy ion etching, heated and magnetic stage. A low energy ion source 350 can also be included in the BIBS 300.

In an operation 380, the low energy ion source 350 a negative bias voltage is applied to the target material and the negatively biased sputtering target material is sputtered onto the substrate. The negatively biased sputtering targets can include materials such as silicon (Si) 340, tin (Sn) 330, iron (Fe), Aluminum (Al), carbon (C) 338 and organic monomers for polymer deposition. The maximum energy of the ions emitted from the low energy ion source 350 is less than about 30 eV. The about 30 eV is a sputter threshold of the vacuum system materials. There is no need to capture all of the ions on the rotating targets 330-340 because the about 30 eV is low enough to prevent unwanted sputtering from other targets that the low energy ions might impact.

The sputtering targets 330-340 can be mounted on a turntable 361. In an operation 382, the turn table 361 can be rotated in directions 362A, 362B. The targets 330-340 can be rotated about the substrate 110. As the targets 330-340 are rotated into position before the substrate 110, corresponding composite layers or organic-inorganic multilayers or polymer can be sputtered onto the substrate. The deposition layers can be formed sequentially or condensed vapor deposition types. Each deposited layer has a thickness of between less than about 100 nanometer to about 50 micrometers.

Useful organic polymers such as polytetrafluoroethylene (PTFE) or polyethylene terephthalate (PET or PETE) can be used for co-sputtering to assist in forming pores in the resulting film. The organic polymers can break down to form a monomer, bis-β-hydroxyterephthalate (BHET). The BHET monomer can be evaporated at about 200 degrees C. during the co-sputtering process. The co-sputtering process forms a mixture of Si+Sn+BHET monomer in a composite film.

In an operation 384, if there is not a sufficient film thickness of the Sn—Si and organic/polymer layers are formed on the substrate 110, then the method operations continue in operation 376, as described above. If a sufficient film thickness of the Sn—Si and organic/polymer layers are formed on the substrate 110, then the method operations continue in operation 386.

In an operation 386, the BHET monomer in the composite film is polymerized. The BHET monomer can be polymerized by an ultraviolet (UV) light source 352. The range of UV power density can be between about 0.1 to about 10 W/cm$^2$. The UV wavelength is optimized to between about 200 and about 460 nm at about 1,000 W power for the polymerization.

In operation 388, the substrate 110 is heated to anneal the polymerized composite film in an RTP chamber to form selectively porous Si—Sn thin film electrode layers. The annealing process heats the substrate 110 to between about 400 and about 1000 degrees C. for between about 1 min to about 60 minutes. The porosity can be selected by the RTP parameters such as at least one of an annealing temperature, an annealing time, pressure, wavelength, and/or inert gas flow or other RTP parameters and combinations thereof. The annealing evaporates the organic polymer material layers thus providing the selective porosity of the electrode materials for lithium ion battery. The composition of Si for synthesized porous Si-polymer electrode can be between about 95 percent to about 99.9 percent silicon.

Figure 4:
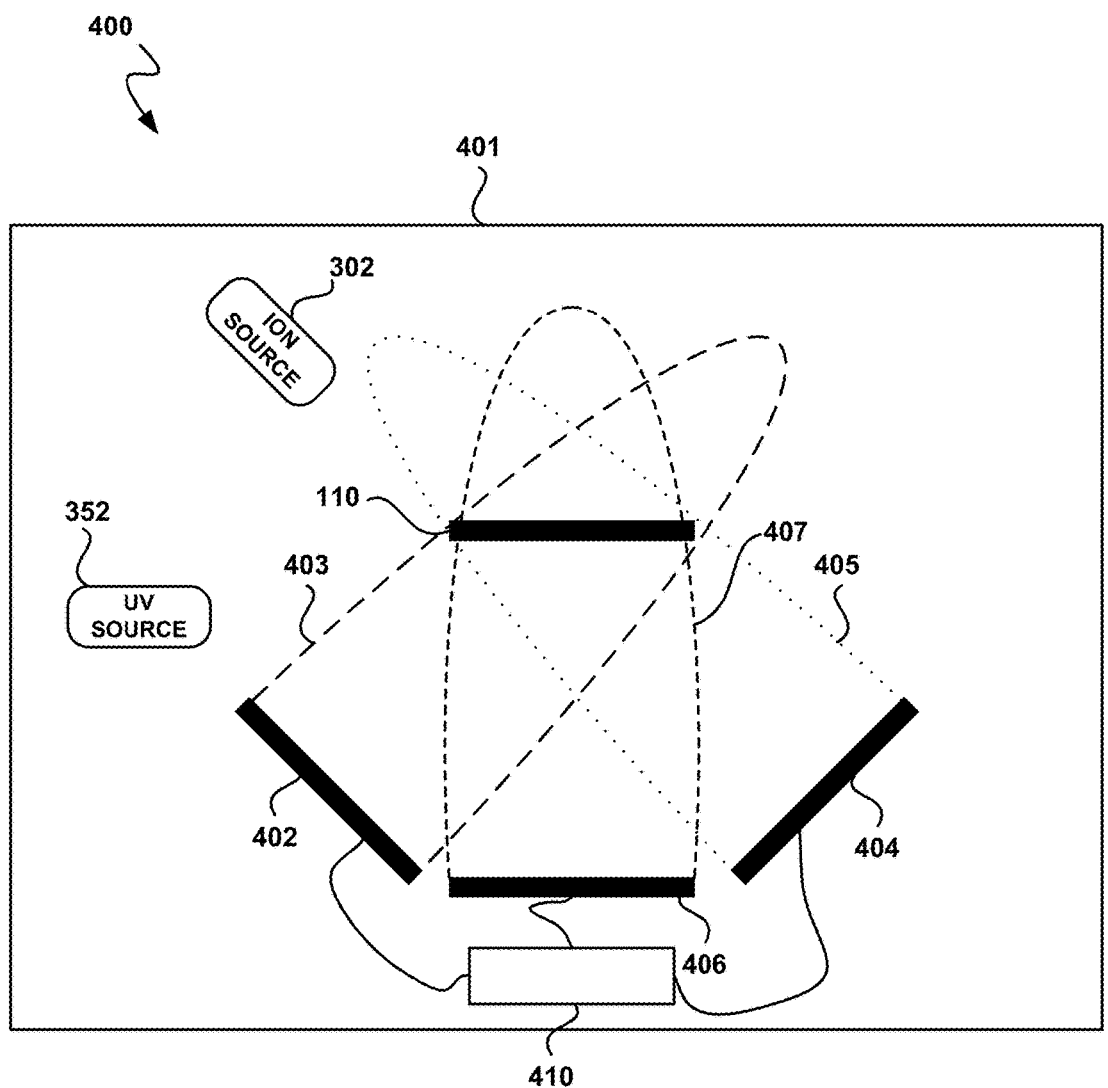
FIG. 4 is a simplified schematic diagram of a co-sputtering system, in accordance with embodiments of the present invention.

FIG. 4 is a simplified schematic of a co-sputtering system 400, in accordance with embodiments of the present invention. The co-sputtering system 400 allows different target materials to be sputtered at the same time, with independently controlled power to each of the sputter material targets 402, 404, 406. Co-sputtering of multi different materials has typically been accomplished with ion beam sputtering, Radio Frequency (RF) or Direct Current (DC) sputtering or magnetron sputtering. The three or more sputtering targets can include a tin target 402, a silicon target 404 and a carbon or organic material target 406. The composition ratio of three species can range between about 10 percent and about 40 percent silicon, between about 90 percent and about 60 percent tin and between about 0.1 percent and 1.0 percent carbon/organic polymer as the layers are formed on the substrate 110.

After a sufficient thickness of the Sn—Si-organic polymer layers are formed on the substrate 110, the substrate will be annealed. The annealing conditions are in an inert gas (e.g., argon) environment at about 10 mTorr pressure. The annealing temperature range is between about 200 and about 500 degrees C. for a time of between about 10 minutes and about 60 minutes. The annealing conditions depend on the polymer species. By way of example, a thermal process of polymer blends such as poly(3-hexylthiophene), (P3HT) and phenyl-C61-butyric acid methyl ester (PCBM) was observed at 225° C. for 30 min The annealing process evaporates the organic polymer layers in the Si—Sn—C film to produce a gas phase byproduct. As the organic polymer layers evaporate spaces, i.e., pores, are created in the remaining Si—Sn thin film. Any residual carbon in the Si—Sn thin film after the annealing process can enhance the porosity of the Si—Sn thin film anode system.

Element deposition can be easily controlled because each of the target materials sputter at different rates at different temperatures. By way of example, if a desired ratio of Si/(Si+Sn+C) is 0.4 the RTP after co-sputtering process needs a temperature gradient of between about 300 to about 600 degrees C. over a period from about 10 to about 100 seconds. The layers are deposited by co-sputtering techniques using multiple targets and then a selected, temperature controlled annealing process creates the pores in the materials. In another example, a ratio of Si/(Si+Sn+Al+C) is between about 0.1 to about 0.4 after annealing.

For more efficient mass production of porous thin film anode materials, the in-line sputtering and evaporation system can be set up horizontally or vertically.

Figure 5:
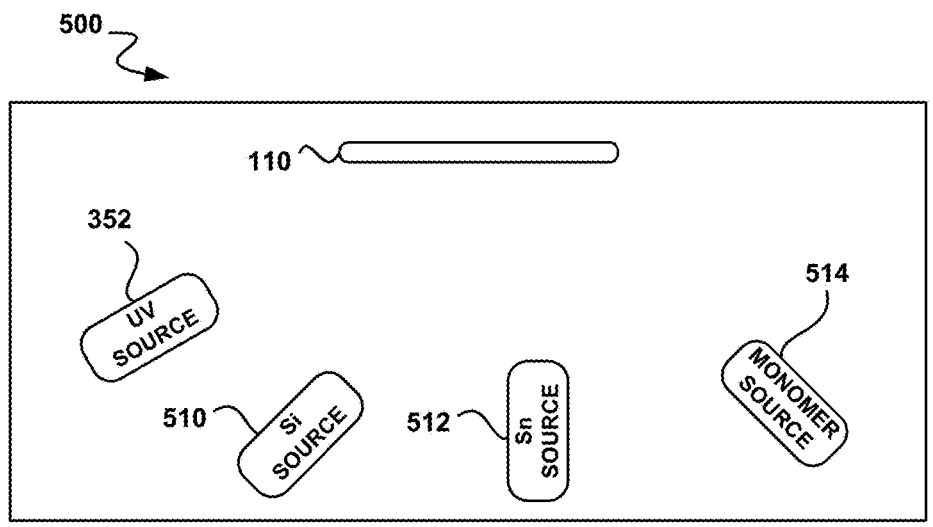
FIG. 5 is . . . , in accordance with embodiments of the present invention.

FIG. 5 is a simplified schematic diagram of a UV assisted co-evaporation system 500, in accordance with embodiments of the present invention. The UV assisted co-evaporation system 500 can be used to fabricate a mixture layer of Si—Sn-organic monomer anode materials similar to the systems and methods described above. The UV assisted co-evaporation system 500 includes a UV source 352, a silicon source 510, a tin source 512 and a monomer source 514. Each of the sources 352, 510-514 are directed toward a wafer 110. A mixture layer can be formed on the wafer 110 as described above. The monomer in the mixture layer can then be polymerized by a the UV source 352 in a UV assisted curing process.

Figure 6:
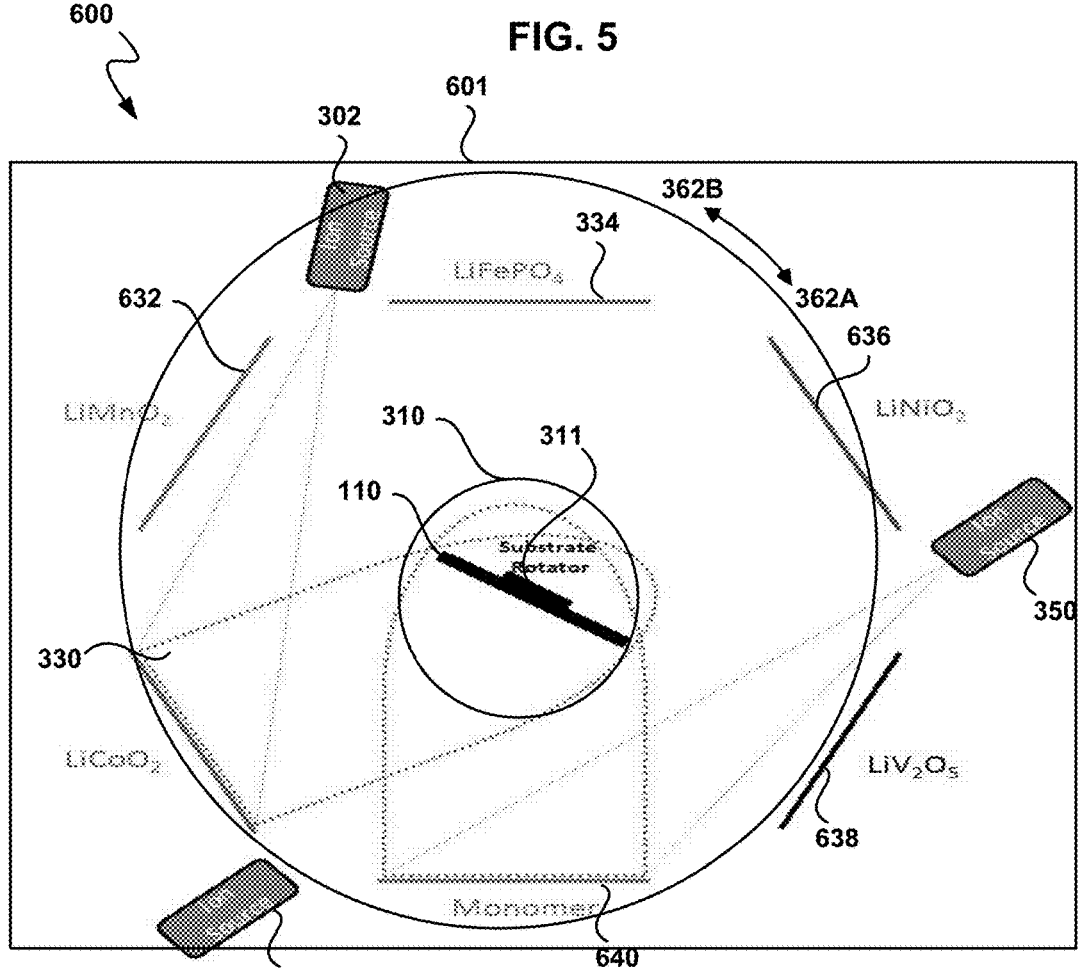
FIG. 6 is a simplified schematic diagram of the BIBS used for forming a porous, thin film cathode, in accordance with embodiments of the present invention.

FIG. 6 is a simplified schematic diagram of the BIBS 600 used for forming a porous, thin film cathode, in accordance with embodiments of the present invention. The BIBS 600 is substantially similar to the BIBS 300 shown in FIG. 3A above, except the sputtering target materials are selected for cathode purposes, i.e., to provide the needed ions for the energy storage. Specifically, the different sputtering target materials contain lithium ions with polymers can be used to form porous thin film cathode materials. For example, target 630 can include a lithium cobalt oxide (LiCoO2) material, target 632 can include a lithium manganese oxide (LiMn2O4) material, target 638 can include a lithium vanadium oxide (LiV2O5) material, target 634 can include a lithium iron phosphate (LiFePO4) material, target 636 can include a lithium nickel manganese cobalt oxide ($Li_xNi_y$-$Co_zMg_mO2$) material or a lithium nickel cobalt aluminum oxide ($Li_xNi_yCo_zAl_mO2$) material. Target 640 includes an organic polymer or monomer.

The voltage range of biased targets is from −50 to −2000V. During the cathode film growth, the composition of the lithium metal oxide is up to 99.0-99.9%. The organic polymer such as PTFE and PET is in the range of 0.1 to 1.0% in the fabricated cathode.

A porous, thin film cathode can also be formed using thermal evaporation of lithium metal oxides and organic polymers. The source material is evaporated in a high vacuum around $10^4$ mTorr. The low pressure of the processing chamber allows the thermally evaporated lithium metal oxides and organic polymer particles to travel directly to the substrate. The thermally evaporated lithium metal oxides and organic polymer particles condense on the substrate to form a thin film.

Both lithium metal oxide and polymer sources are used for porous thin film cathodes by vapor deposition techniques.

Purity of the LiCoO2 and monomer sources is more than 99.9% during growth of the porous layer. Cathode thermal process is same with anode thermal process. Designed molecular ratio of the polymer has a range of 0.1-1% during the deposition.

Figure 7:
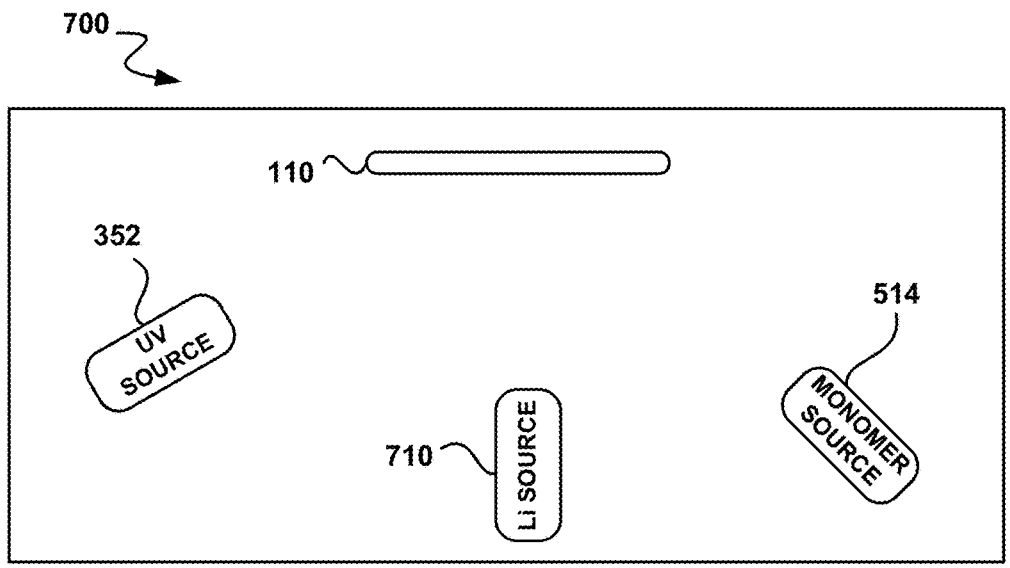
FIG. 7 is a simplified schematic diagram of a UV assisted co-evaporation system, in accordance with embodiments of the present invention.

FIG. 7 is a simplified schematic diagram of a UV assisted co-evaporation system 700, in accordance with embodiments of the present invention. The UV assisted co-evaporation system 700 can be used to fabricate a mixture layer of LiCoO2-organic monomer cathode materials similar to the systems and methods described above. The UV assisted co-evaporation system 700 includes a UV source 352, a lithium containing material such as LiCoO2 source 710 and a monomer source 514. Each of the sources 352, 514, 710 are directed toward a wafer 110. A mixture layer can be formed on the wafer 110 as described above. The monomer in the mixture layer can then be polymerized by the UV source 352 in a UV assisted curing process.

Figure 8:
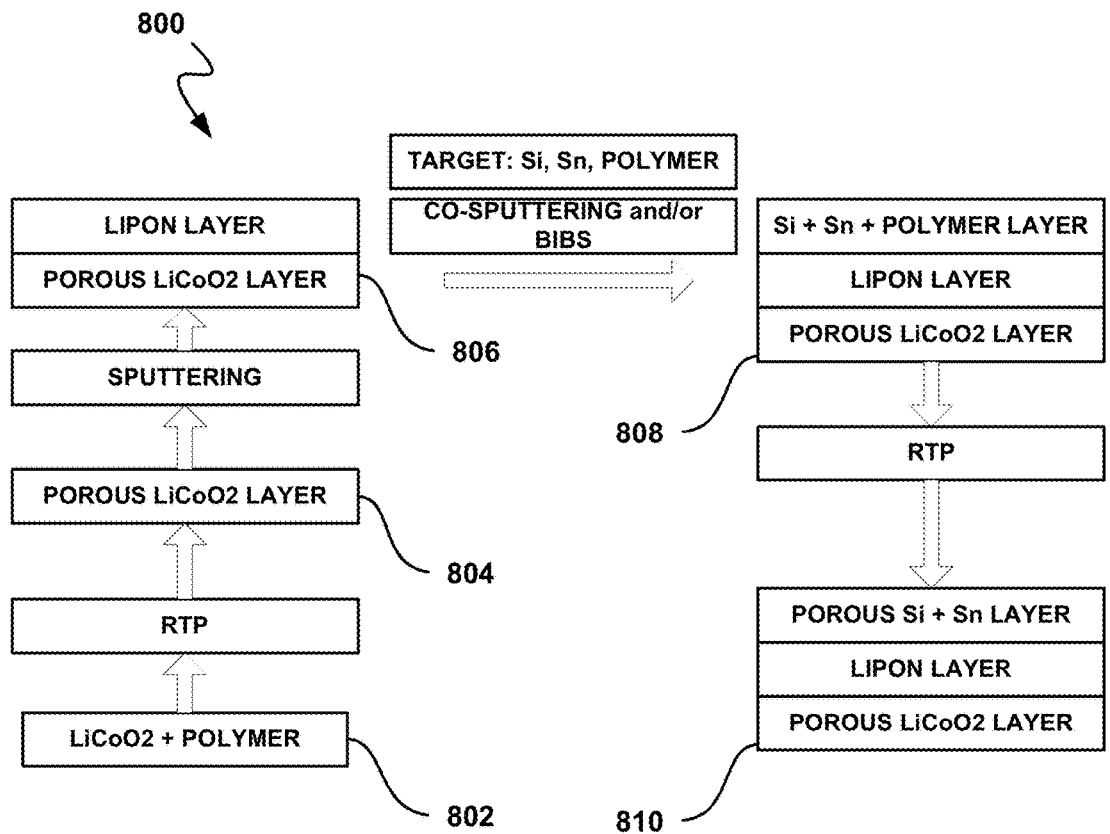
FIG. 8 is a combination process flow for forming porous thin film layers, in accordance with embodiments of the present invention.

The porous thin film layers including the cathode, LiPON (lithium, phosphorous, oxygen, nitrogen) electrolyte and anode can be sequentially fabricated on the substrate using BIBS, co-evaporation, co-sputtering and thermal evaporation techniques. FIG. 8 is a combination process flow 800 for forming porous thin film layers, in accordance with embodiments of the present invention. The combination process flow 800 includes co-sputtering, BIBS and RTP processes 802-810. In an operation 802, a LiCoO2 and polymer combination layer is formed on the substrate. In an operation 804, a rapid thermal process is applied to evaporate the polymer and produce the porous LiCoO2 layer. In an operation 806 a LiPON layer is deposited on the porous LiCoO2 layer. In an operation 808, a combination Si, Sn and polymer layer is formed on the LiPON layer. The Si, Sn and polymer layer can be formed in a co-sputtering and/or BIBS process as described above. In an operation 810, a rapid thermal process evaporates the polymer from the Si, Sn and polymer layer to form a porous Si, Sn layer.

Figure 9:
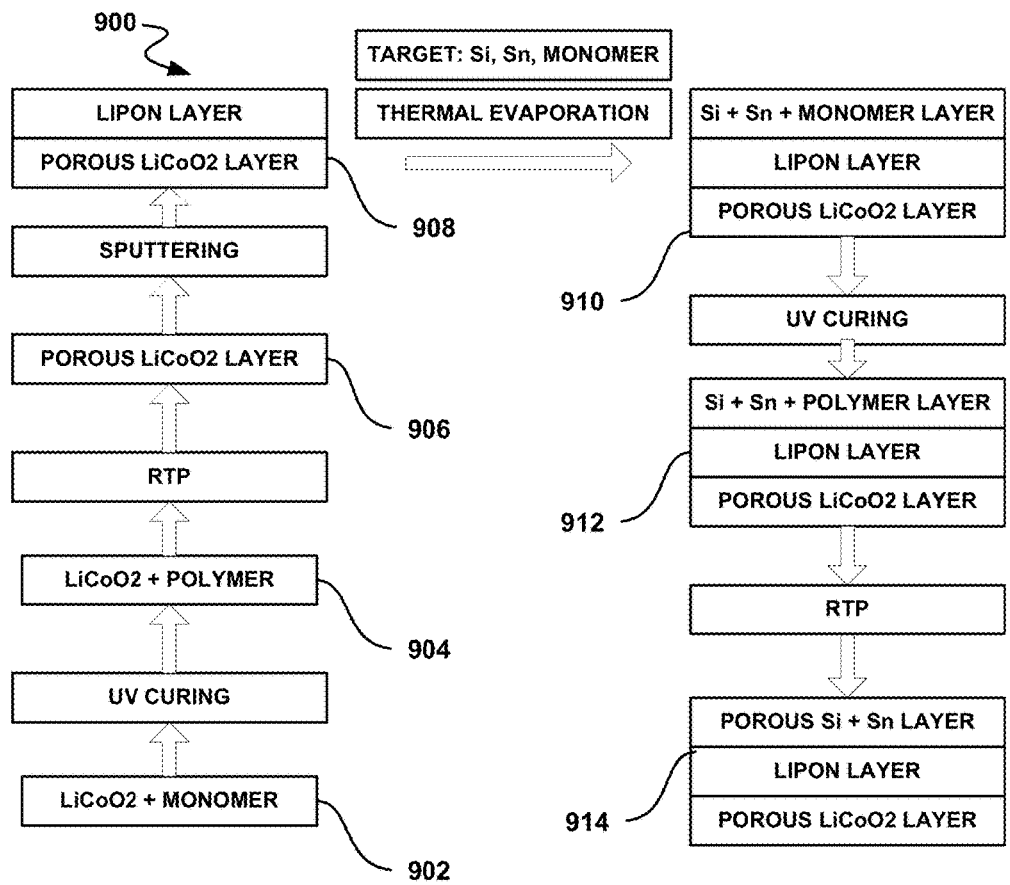
FIG. 9 is a combination process flow for forming porous thin film layers, in accordance with embodiments of the present invention.

FIG. 9 is a combination process flow 900 for forming porous thin film layers, in accordance with embodiments of the present invention. The combination process flow 900 includes UV curing or polymerization, co-sputtering, BIBS and RTP processes 902914. In an operation 902, a LiCoO2 and monomer combination layer is formed on the substrate. In an operation 904, a ultraviolet curing process converts the monomer to a polymer to produce a LiCoO2 and polymer combination layer. In an operation 906, a rapid thermal process is applied to evaporate the polymer and produce the porous LiCoO2 layer. In an operation 908 a LiPON layer is deposited on the porous LiCoO2 layer. In an operation 910, a combination Si, Sn and monomer layer is formed on the LiPON layer. The Si, Sn and monomer layer can be formed in a thermal evaporation process as described above. In an operation 912, an ultraviolet curing process converts the monomer to a polymer to produce a Si, Sn and polymer layer. In an operation 914, a rapid thermal process evaporates the polymer from the Si, Sn and polymer layer to form a porous Si, Sn layer.

Figure 10:
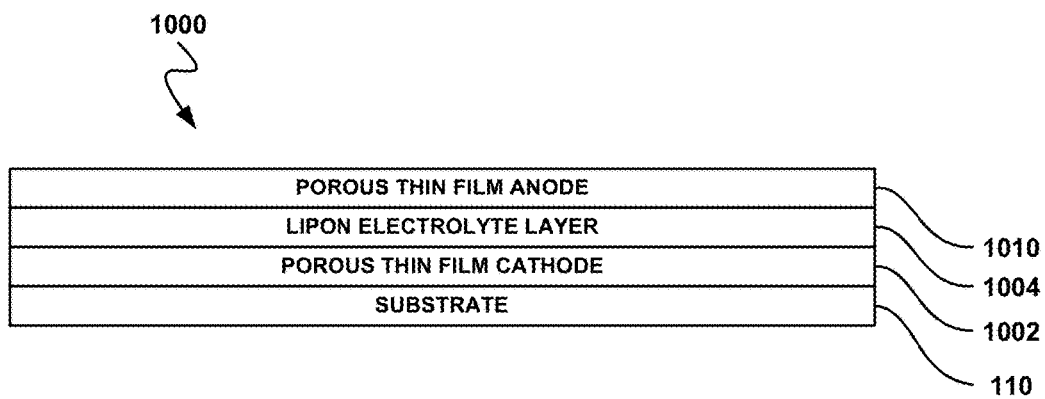
FIG. 10 is a simplified schematic diagram of a lithium ion battery, in accordance with embodiments of the present invention.

FIG. 10 is a simplified schematic diagram of a lithium ion battery 1000, in accordance with embodiments of the present invention. The combination process flows 800, 900 can be used to form the lithium ion battery 1000. The lithium ion battery 1000 includes the substrate 110, porous thin film cathode layer 1002 formed on the substrate, lithium ion containing electrolyte layer 1004 formed on the cathode layer 1002 and a porous thin film anode layer 1010 formed on the electrolyte layer 1004.

The large surface area having a surface area to volume ratio of between about 0.3 to about 3.0 provides double layer formation. Electrochemical capacitors take advantage of the interface area and the surface area of porous materials will dramatically increase lithiation and delithiation ability during the charge and discharge without losing electrochemical properties of the Li ion battery system.

Lithium ion battery system in which the reaction kinetics is slow increasing the area allows for larger currents with less voltage drops. Li-ion batteries using porous thin film electrodes fall into this category.

Figure 11:
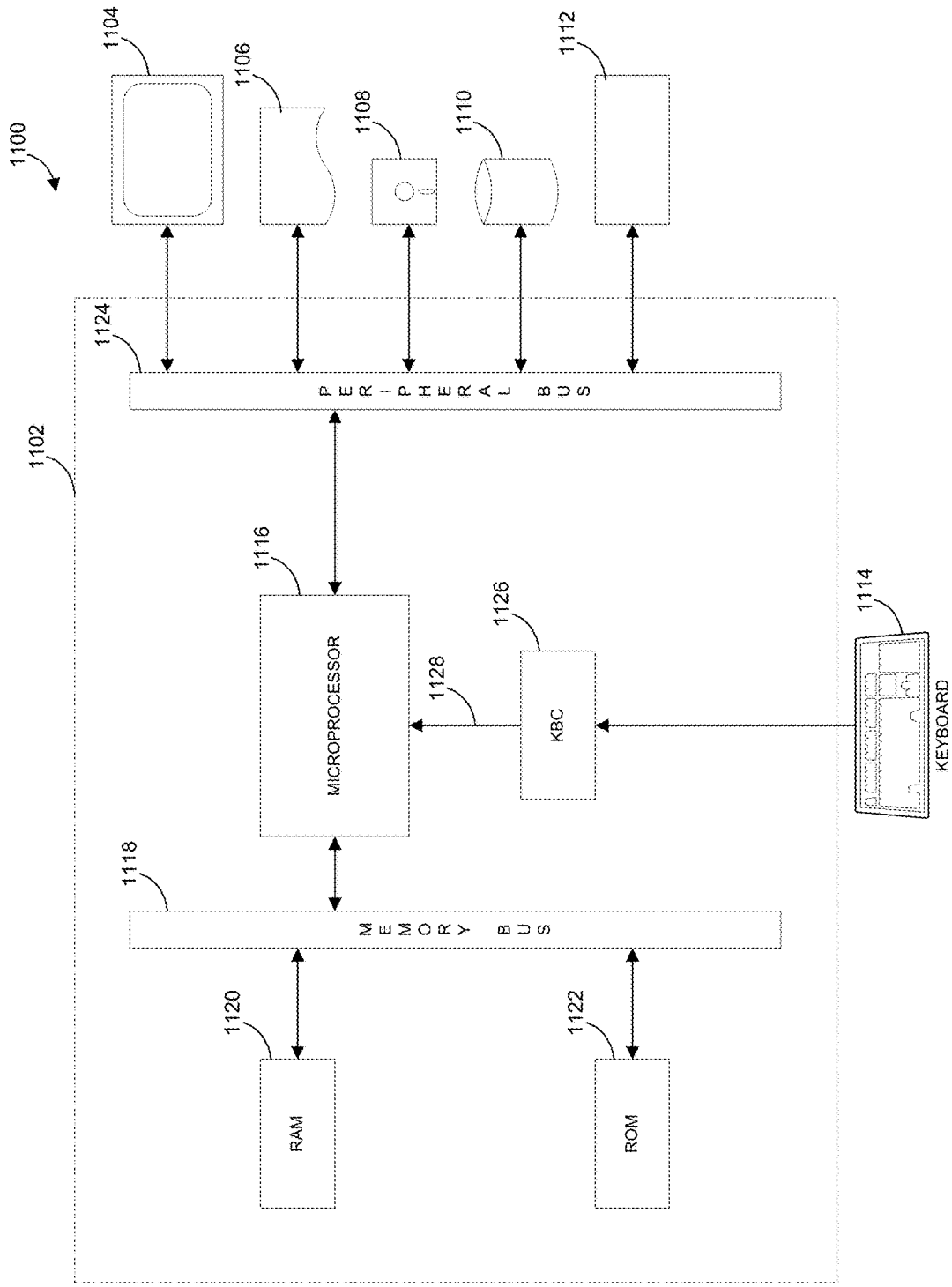
FIG. 11 is a block diagram of an exemplary computer system for carrying out the processing according to the invention.

As simple and cost effective fabrication process, biased ion beam sputtering (BIBS), co-evaporation, co-sputtering and thermal evaporation methods for hybrid porous thin films does not require ultra-high vacuum deposition, photolithography, or clean room facilities FIG. 11 is a block diagram of an exemplary computer system 1100 for carrying out the processing according to the invention. The computer system 1100 can be used in controller 252 and other control systems coupled to one or more of the above systems. The computer system 1100 includes a digital computer 1102, a display screen (or monitor) 1104, a printer 1106, a floppy disk or other computer readable media that is removable 1108, a hard disk drive or similar persistent storage device 1110, a network interface 1112, and a keyboard 1114. The digital computer 1102 includes a microprocessor 1116, a memory bus 1118, random access memory (RAM) 1120, read only memory (ROM) 1122, a peripheral bus 1124, and a keyboard controller (KBC) 1126. The digital computer 1102 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 1116 is a general purpose digital processor, which controls the operation of the computer system 1100. The microprocessor 1116 can be a single-chip processor or can be implemented with multiple components. Using instructions retrieved from memory, the microprocessor 1116 controls the reception and manipulation of input data and the output and display of data on output devices.

The memory bus 1118 is used by the microprocessor 1116 to access the RAM 1120 and the ROM 1122. The RAM 1120 is used by the microprocessor 1116 as a general storage area and as scratch-pad memory, and can also be used to store input data and processed data. The ROM 1122 can be used to store instructions or program code followed by the microprocessor 1116 as well as other data.

The peripheral bus 1124 is used to access the input, output, and storage devices used by the digital computer 1102. In the described embodiment, these devices include the display screen 1104, the printer device 1106, the floppy disk drive 1108, the hard disk drive 1110, and the network interface 1112. The keyboard controller 1126 is used to receive input from keyboard 1114 and send decoded symbols for each pressed key to microprocessor 1116 over bus 1128.

The display screen 1104 is an output device that displays images of data provided by the microprocessor 1116 via the peripheral bus 1124 or provided by other components in the computer system 1100. The printer device 1106, when operating as a printer, provides an image on a sheet of paper or a similar surface. Other output devices such as a plotter, typesetter, etc. can be used in place of, or in addition to, the printer device 1106.

The floppy disk or other removable computer readable media 1108 and the hard disk drive or other persistent storage media 1110 can be used to store various types of data. The floppy disk drive 1108 facilitates transporting such data to other computer systems, and hard disk drive 1110 permits fast access to large amounts of stored data.

The microprocessor 1116 together with an operating system operate to execute computer code and produce and use data. The computer code and data may reside on the RAM 1120, the ROM 1122, or the hard disk drive 1110. The computer code and data could also reside on a removable program medium and loaded or installed onto the computer system 1100 when needed. Removable program media include, for example, CD-ROM, PC-CARD, floppy disk, flash memory, optical media and magnetic tape.

The network interface 1112 is used to send and receive data over a network connected to other computer systems. An interface card or similar device and appropriate software implemented by the microprocessor 1116 can be used to connect the computer system 1100 to an existing network and transfer data according to standard protocols.

The keyboard 1114 is used by a user to input commands and other instructions to the computer system 1100. Other types of user input devices can also be used in conjunction with the present invention. For example, pointing devices such as a computer mouse, a track ball, a stylus, or a tablet can be used to manipulate a pointer on a screen of a general-purpose computer.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method of forming a porous thin film battery comprising:
   forming a porous thin film cathode on a substrate that includes:
   forming a plurality of layers of a cathode material on the substrate, each of the plurality of layers of the cathode material including a thickness between about 1 and about 50 micrometers;
   forming a plurality of layers of a polymer material, wherein the plurality of polymer material layers are disposed between at least a portion of the plurality of cathode material layers, and each of the plurality of layers of the polymer material includes a thickness between about 1 and about 50 micrometers;
   annealing the plurality of cathode material layers and the plurality of polymer material layers to form a cathode combination layer; and
   removing the polymer material to form a plurality of pores in the cathode combination layer;
   forming an electrolyte layer on the porous thin film cathode; and
   forming a porous thin film anode on the electrolyte layer that includes:
   forming a plurality of layers of an anode material layer on the substrate in a co-sputtering process, the anode material including silicon, and each of the plurality of layers of the anode material including a thickness between about 1 and about 50 micrometers;
   forming a plurality of layers of a monomer material in the co-sputtering process, wherein the plurality of monomer material layers are disposed between at least a portion of the plurality of anode material layers;
   converting the plurality of monomer material layers to a plurality of polymer material layers;
   annealing the plurality of anode material layers and the plurality of polymer material layers to form a anode combination layer; and
   removing the polymer material to form a plurality of pores in the anode combination layer.

2. The method of claim 1, wherein removing the polymer material includes evaporating the polymer materials.

3. The method of claim 1, wherein the cathode combination layer has a thickness of between about 1 micrometer and about 50 micrometers.

4. The method of claim 1, wherein forming the porous thin film cathode includes:
   forming a plurality of layers of a monomer material, wherein the plurality of monomer material layers are disposed between at least a portion of the plurality of cathode material layers; and
   converting the plurality of monomer material layers to the plurality of polymer material layers to form the plurality of polymer material layers.

5. The method of claim 1, further comprising exposing the plurality of monomer material layers to UV radiation to convert the plurality of monomer material layers to the plurality of polymer material layers.

6. The method of claim 1, wherein converting the plurality of monomer material layers to the plurality of polymer material layers, forming the plurality of layers of the anode material layer, and forming the plurality of layers of a monomer material occur simultaneously.

7. The method of claim 1, wherein forming a plurality of layers of a cathode material on the substrate includes at least forming a cathode layer that includes lithium, cobalt, and oxygen.

8. The method of claim 1, wherein forming a plurality of layers of a cathode material on the substrate includes at least forming a cathode layer that includes lithium, manganese, and oxygen.

9. The method of claim 1, wherein forming a plurality of layers of a cathode material on the substrate includes at least forming a cathode layer that includes lithium, vanadium, and oxygen.

10. The method of claim 1, wherein forming a plurality of layers of a cathode material on the substrate includes at least forming a cathode layer that includes lithium, iron, and phosphate.

11. The method of claim 1, wherein forming a plurality of layers of a cathode material on the substrate includes at least forming a cathode layer that includes lithium, nickel, cobalt, and oxygen.

* * * * *